United States Patent [19]

Jones et al.

[11] Patent Number: 4,811,136

[45] Date of Patent: Mar. 7, 1989

[54] PHASE CONTROLLER FOR PROCESSING CURRENT AND VOLTAGE FAULTS

[76] Inventors: Gregory D. Jones, 3430 Robey Ave., Rockford, Ill. 61103; William R. Owens, 4879 Linden Rd., Apt. 142, Rockford, Ill. 61109; Clifford G. Thiel, 9963 High Rd., Stillman Valley, Ill. 61084; Clive M. Danby, 3205 Minnesota Dr., Rockford, Ill. 61108

[21] Appl. No.: 137,575

[22] Filed: Dec. 24, 1987

[51] Int. Cl.⁴ .............................................. H02H 3/38
[52] U.S. Cl. .................................................... 361/79
[58] Field of Search .......................... 361/79, 86, 87, 88, 361/90, 91, 92, 93, 95; 307/64, 85, 86; 340/660, 661, 662, 663, 664

[56] References Cited

U.S. PATENT DOCUMENTS

| | | | |
|---|---|---|---|
| 3,337,742 | 8/1967 | Baehr et al. | 307/64 |
| 3,505,598 | 8/1967 | Merrill | 324/77 |
| 4,075,502 | 2/1973 | Walley, Jr. | 307/64 |
| 4,087,697 | 5/1973 | Johnson | 307/66 |
| 4,096,395 | 6/1973 | Bogel et al. | 307/64 |
| 4,156,280 | 5/1979 | Griess | 364/481 |
| 4,219,858 | 8/1980 | DePuy et al. | 361/93 |
| 4,219,860 | 8/1980 | DePuy | 361/94 |
| 4,231,029 | 10/1980 | Johnston | 340/658 |
| 4,356,553 | 10/1982 | Steinle et al. | 364/483 |
| 4,384,213 | 5/1983 | Bogel | 307/64 |
| 4,405,867 | 9/1983 | Moakler et al. | 307/64 |
| 4,423,458 | 12/1983 | Stich | 361/93 |
| 4,446,498 | 5/1984 | Stich | 361/87 |
| 4,475,047 | 10/1984 | Ebert, Jr. | 307/66 |
| 4,520,275 | 5/1985 | Marusik | 307/64 |
| 4,535,409 | 8/1985 | Jindrick et al. | 364/481 |
| 4,583,004 | 4/1986 | Yearsin | 307/64 |
| 4,605,982 | 8/1986 | Harner et al. | 361/94 |
| 4,625,283 | 11/1986 | Hurley | 364/487 |
| 4,628,397 | 12/1985 | Gareis et al. | 361/98 |
| 4,638,175 | 1/1987 | Bradford et al. | 361/90 X |
| 4,677,311 | 6/1987 | Morita | 361/90 X |
| 4,685,020 | 8/1987 | Driscoll et al. | 361/90 X |
| 4,703,191 | 10/1987 | Ferguson | 307/64 |
| 4,717,984 | 1/1988 | Henry et al. | 361/92 |
| 4,763,220 | 8/1988 | Belbel et al. | 361/91 |

Primary Examiner—A. D. Pellinen
Assistant Examiner—Derek S. Jennings
Attorney, Agent, or Firm—Antonelli, Terry & Wands

[57] ABSTRACT

A power supply system for processing current and voltage faults is disclosed. Each phase of a first power source (12) and each phase of a second power source (28) has a pair of switches (60, 64) for controlling the conduction of current from the phase of the power source to a phase load (29). In each of the phases of the first power source (12), a first switch (60) is controlled by a first control signal which has a high level when a voltage fault or current fault condition does not exist. When either a voltage fault or a current fault condition exists, the first switch (60) is turned off. The second switch (64) is turned on by a second control signal during a determination of whether a current fault exists. Furthermore, a logic network causes the first control signal to assume the second level in response to any one of an RMS over/under voltage fault, an instantaneous overcurrent fault, an I²t fault, or an instantaneous voltage fault occurring in the phase to which the switches are connected or in any one of the other phases in the first power source. Upon the detection of a voltage fault condition, the first power source (12) is disconnected from the load and a second power source is connected to the load. All of the phases of the first power source are disconnected either immediately in response to the detection of a fault in any one of the phases or, alternatively, the phase with the fault is immediately disconnected and the remaining phases without a fault are disconnected at the zero current crossing points of the AC signal of the phases. The phases of the second source are connected at a point when the voltage of the phase is zero.

39 Claims, 6 Drawing Sheets

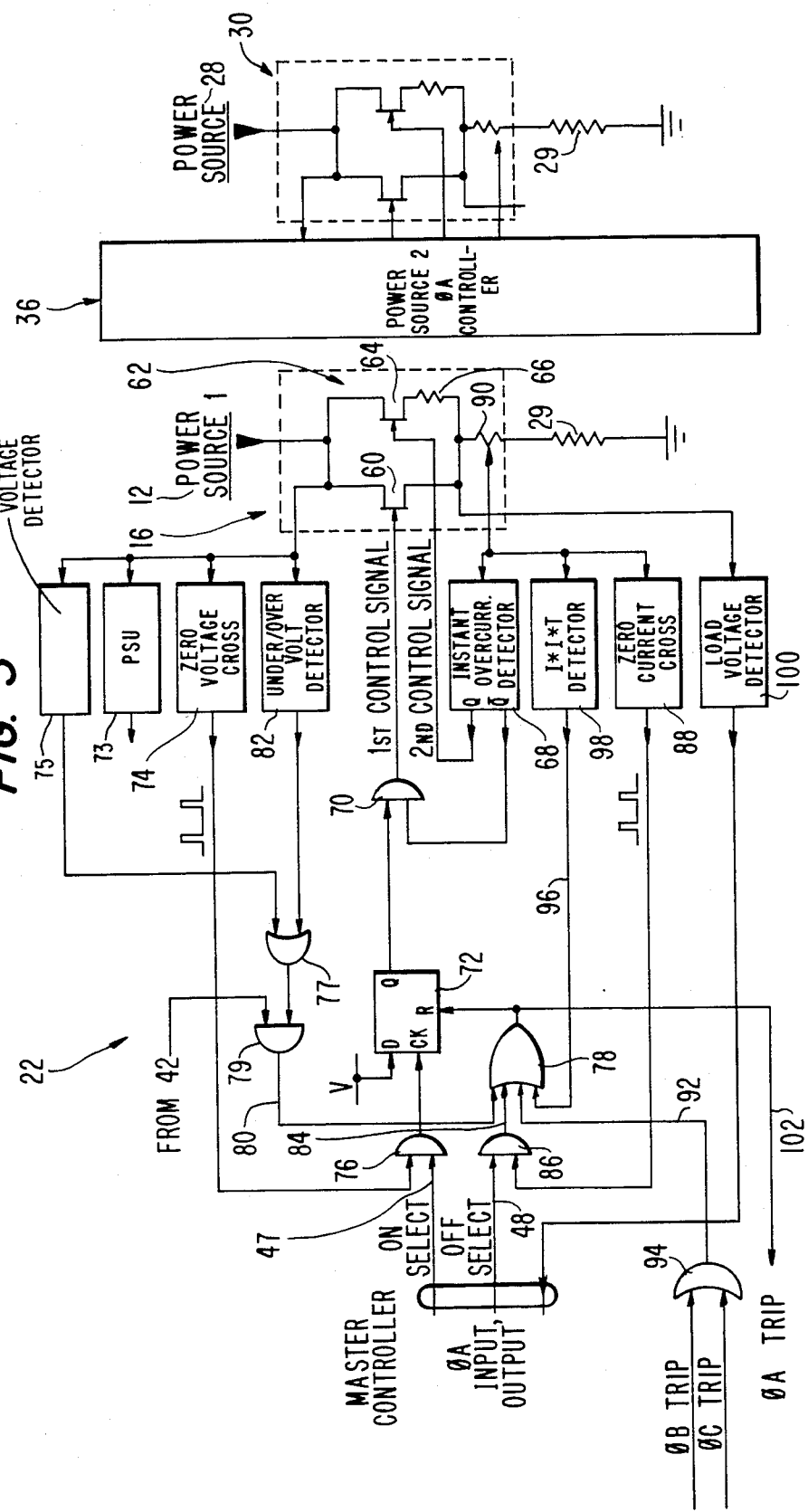

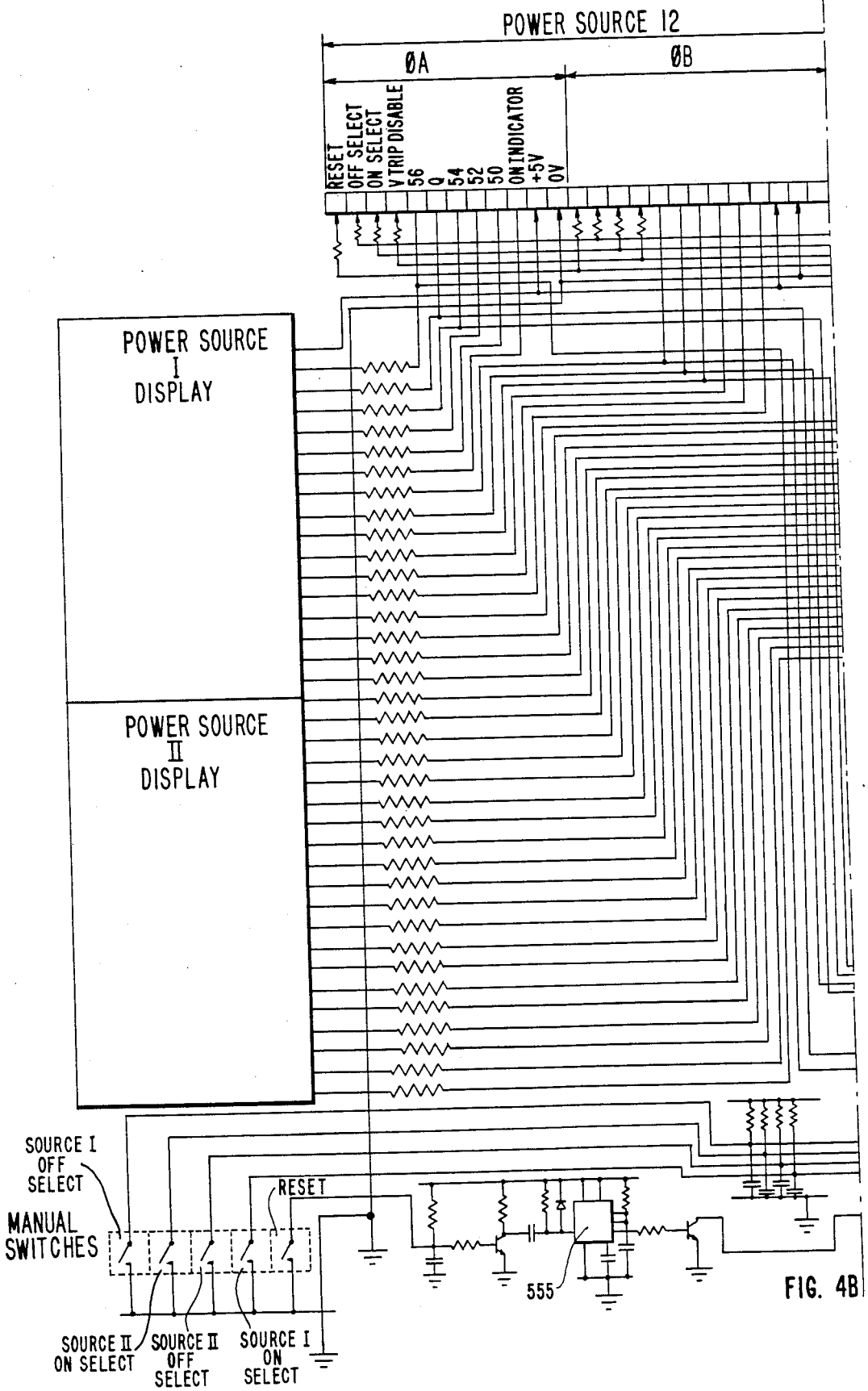

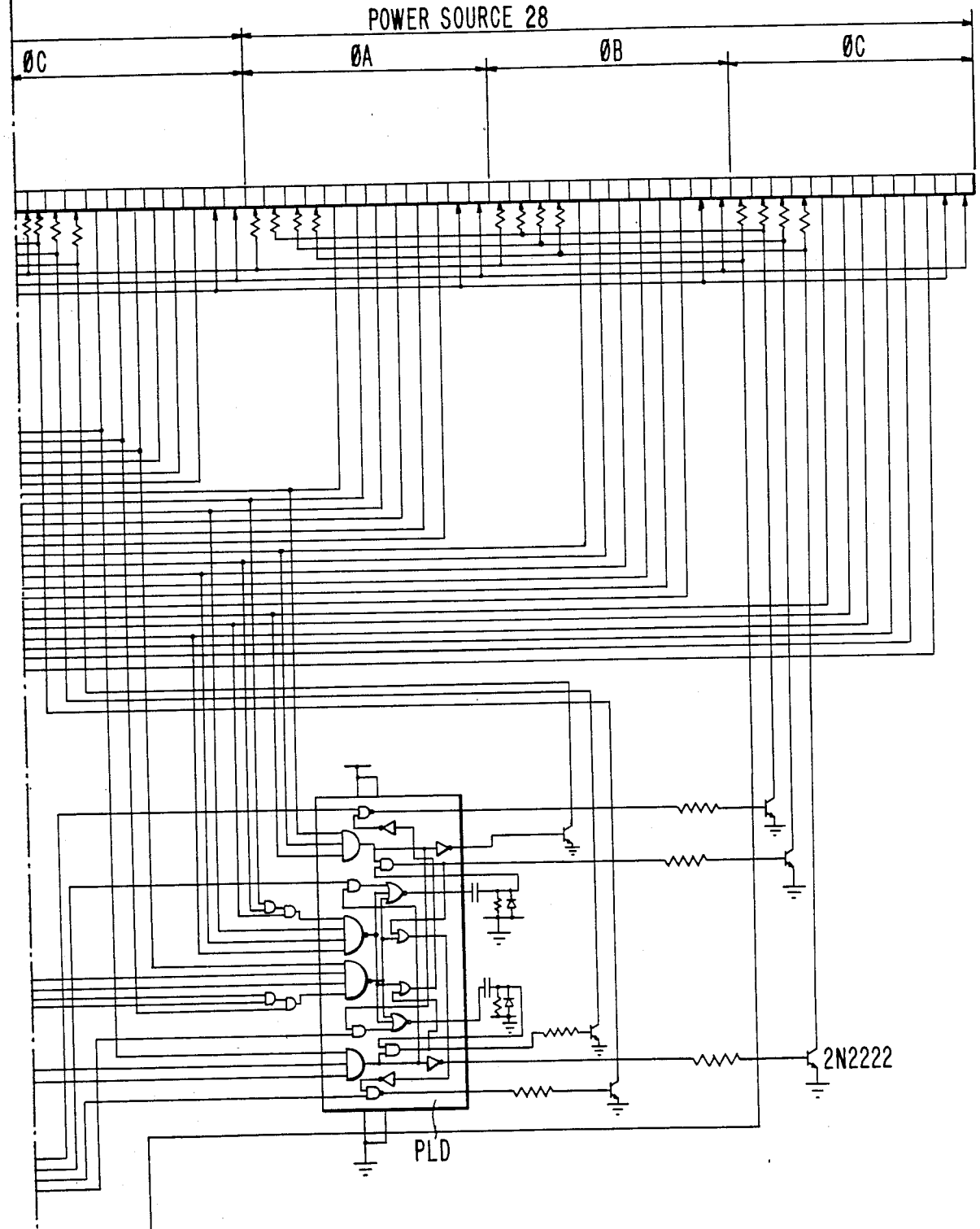

PHASE CONTROLLER FOR PROCESSING CURRENT AND VOLTAGE FAULTS

CROSS REFERENCE TO RELATED APPLICATIONS

Reference is made to the following applications which contain subject matter related to the present application and which are incorporated herein by reference in their entirety:

1. $I^2t$ Trip Generator, U.S. patent application Ser. No. 78,366, filed on July 27, 1987.
2. Current Fault Protection System, U.S. Pat. application Ser. No. 07/137583, filed on even date herewith.
3. Voltage Fault Detector, U.S. patent application Ser. No. 07/137735, filed on even date herewith.
4. Power Controller, U.S. patent application Ser. No. 07/137582, filed on even date herewith.

1. Technical Field

The present invention relates to the processing of current (load) and voltage faults in single phase or multiple phase power supply systems.

2. Background Art

In power supplies for airframes power supplies are used which have a first multiple phase power source which supplies electrical power to electrical loads, which require a minimum of interruption of power and a second backup power supply which is connected to the electrical load upon the detection of an electrical fault in one or more of the phases of the first power source. These power supplies do not disconnect the phases of the first power source, which do not have a fault, at a precise point during the cycle of the AC power provided by the first power source and control the connection of the phases of the second power source to the electrical load at a precise point during the cycle of the AC power provided by the second power source.

Power supplies in applications other than airframes are known in which a primary operating power supply is backed up with a backup power supply which is connected to the load upon the detection of an electrical fault condition in the first power supply. See U.S. Pat. Nos. 3,337,742, 4,075,502, 4,087,697, 4,096,395, 4,231,029, 4,384,213, 4,405,867, 4,520,275 and 4,583,004. None of these power supplies disconnects the phases of the first power supply, which do not have a fault, at a precise point during the cycle of the AC power provided by the first power source and control the connection of the phases of the second power source to the electrical load at a precise point during the cycle of the AC power provided by the second power source.

Conventional circuit breakers are based upon the principal that a power supply is disconnected from a load when a load fault is detected. Circuit breakers disconnect the power source from the load when current flow greater than a rated current is sensed.

U.S. Pat. Nos. 4,384,213, 4,423,458, 4,520,275, 4,583,004, 4,605,982 and 4,628,397 disclose circuits for monitoring the amount of current flowing from a power source to a load.

Voltage fault detectors are known which sample an AC voltage source a plurality of times during each cycle. U.S. Pat. No. 4,475,047 discloses a system for disconnecting a first power source from a load and connecting a second power source to the load upon detection of a fault condition. The system of U.S. Pat. No. 4,475,047 samples the amplitude of an AC signal a plurality of times during each cycle. A counter stores a word GOODBD whose cumulative value indicates if the sampled voltage is within an acceptable range by counting the number of samples which are within an acceptable range. The counter is augmented each time a sample is within the acceptable range. A number equal to or greater than 5 indicates that the voltage amplitude is acceptable. A further counter counts a word BADCOUNT used to control opening of a line switch when its cumulative value is equal to zero. BADCOUNT is decremented each time a sample is found not to be within an a acceptable range. U.S. Pat. Nos. 3,505,598, 4,087,697, 4,156,280, 4,219,858, 4,219,860, 4,356,553 and 4,423,458 disclose systems for sampling the voltage amplitude of AC voltage sources.

U.S. Pat. No. 4,446,498 discloses a system for monitoring current flow to load which accumulates and decrements a count proportional to current flow for purposes of generating a trip signal when the count reaches a predetermined value.

DISCLOSURE OF INVENTION

The present invention provides a current and voltage fault detection system for disconnecting an electrical load from a first power source upon the detection of a current (load) fault and disconnecting the first power source from the load and connecting a second power source to the load upon the detection of a voltage fault. The detection of a load fault automatically initiates disconnection of the load from the first power source to prevent damage to the first power source and does not initiate connection of the second power source because of the fault being in the first power source. The disconnection of the first power supply from the load and connection of the second power supply to the load is automatically initiated in response to a sensed fault condition in the first power source and provides uninterrupted power for loads such as those encountered in the aviation industry in air frames which require a minimum of interruption. With the invention, disconnection of the first power source upon the detection of a fault in the first power source and connection of the second power source to the load can occur within one-half a cycle after the fault has occurred.

A plurality of operating parameters of the first power source are examined continually to detect both current and load faults. In a preferred form of the invention, the individual controllers of the phases of the first and second power sources are each provided with an RMS under/over voltage detecting circuit, an instantaneous voltage trip circuit, an instantaneous overcurrent detecting circuit and an $I^2t$ trip circuit. The foregoing RMS under/over voltage detecting circuit, instantaneous voltage trip circuit and $I^2t$ trip circuit are detectors for sensing malfunctions in the power supply which provide inputs to a logic circuit for generating a first control signal controlling immediate disconnection of a first phase of the first power source from the load as a consequence of a voltage (nonload) fault and generation of a trip signal controlling the disconnection of other phases of the first power source either immediately or upon the detection of a zero current flow between the other phases and the load. Additionally, a zero voltage detection circuit in the individual phase controllers of the second power source monitors the voltage of each phase and controls the connection of the phases of the second power source to the load synchronous with the zero voltage points of the phases of second power source when the first power source is disconnected. The detection of an overcurrent condition indicative of a load fault by the instantaneous overcurrent detector in any one of the phases causes an immediate disconnection of the load.

A current and voltage fault detection system for disconnecting an electrical load from a first power source upon the detection of a current fault in the load and disconnecting the first power source from the load and connecting a second power source to the load upon the detection of a voltage fault in the first power source includes a first switch disposed in series with the load and the first power source, conduction of the first switch being controlled by a first control signal having first and second levels and passing current to the load when the first control signal is at the first level and blocking current flow when the first signal is at the second level; a shunt circuit, coupled in parallel with the first switch, the shunt circuit containing a second switch coupled to an impedance which limits the amount of current drawn by the load when the impedance is in series with the load, conduction of the second switch being controlled by a second control signal having first and second levels and passing current to permit current flow through the impedance of the shunt circuit when the second control signal has the first level and blocking current flow when the second control signal has the second level; a first control signal generating circuit, responsive to a voltage level of the first power source, the first control signal generating circuit generating the first level of the first control signal in response to not detecting a voltage fault condition in the first power source and generating the second level of the first control signal in response to detecting a voltage fault condition in the first power source; and a second control signal generating circuit, responsive to a current level drawn from the first power source by the load, the second control signal generating circuit generating the first level of the second control signal in response to detection of a current flow between the first power source and the electrical load exceeding a maximum amount and generating the second level of the second control signal in response to detection of a current flow between the first power source and the electrical load not exceeding the maximum amount. The circuit for generating the first control signal is also responsive to the second control signal for generating the second level of the first control signal in response to the first level of the second control signal and generating the first level of the first control signal in response to the second level of the second control signal and a voltage fault condition not being present.

Furthermore, a detector for detecting when the voltage from the first power source exceeds a predetermined maximum or minimum RMS voltage and generating an RMS level signal of a first level when the RMS voltage exceeds one of the predetermined maximum or minimum RMS voltages and a second level when the RMS voltage is less than both the predetermined maximum and minimum RMS voltages is provided. The circuit for generating the first control signal is also responsive to the RMS level signal to generate the second level of the first control signal when the RMS level signal is the first level.

A detector for detecting current flow I between the first power source and the load and producing a power level signal having a first level when $I^2t$ exceeds a predetermined magnitude and a power level signal having a second level when $I^2t$ is less than a predetermined magnitude wherein t is a predetermined time is provided. The circuit for generating the first control signal is also responsive to the power level signal to generate the second level of the first control signal when the power level signal is the first level.

The first power source has a first phase providing current flow between the first power source and the electrical load controlled by the first and second control signals and one or more additional phases providing current flow between the first power source and the electrical load. A trip signal generator is provided for detecting if the one or more additional phases has been tripped to cause disconnection of any one of the one or more additional phases from the load and for generating a trip signal of a second level when the one or more additional phases have not been tripped and a trip signal of a first level when any one of the one or more additional phases have been tripped. The circuit for generating the first control signal is also responsive to the trip signal to generate the second level of the first control signal when the trip signal is at the first level.

Furthermore, the invention provides detectors for detecting when the voltage from the one or more additional phases of the first power source exceeds a predetermined maximum or minimum RMS voltage and for generating a one or more additional phase RMS level signal of a first level when the RMS voltage exceeds one of the predetermined maximum or minimum RMS voltages and a second level when the voltage is less than both the predetermined maximum and minimum RMS voltages. The circuit for generating the first control signal is also responsive to the one or more additional phase RMS level signal from the one or more additional phases of the first power source to generate the second level of the first control signal when the one or more additional phase RMS level signal from the one or more additional phases of the first power source is the first level.

Furthermore, the invention provides detectors for detecting at least the current flow $I_2$ between a second phase of the first power source and the electrical load and the current flow $I_3$ between a third phase of the first power source and the electrical load and for producing a second and third phase power level signal having a first level when either $I_2^2t$ or $I_3^2t$ exceeds a predetermined magnitude and a second level when both $I_2^2t$ and $I_3^2t$ is less than a predetermined magnitude wherein t is a predetermined time. Furthermore, the circuit for generating the first control signal is also responsive to the second and third phase power level signal to generate the second level of the first control signal when the second and third phase power level signal is the first level.

Furthermore, the invention provides voltage fault detectors for detecting when a voltage fault exists in any one of at least the second or third phases of the first power source and for generating a second and third phase voltage fault signal of a first level when a voltage fault exists in any one of at least the second and third phases of the first power source and a second level when a voltage fault does not exist in any one of the second and third phases. The circuit for generating the first control signal is also responsive to the second and third phase voltage fault signal to generate the second level of the first control signal when the second and third phase voltage fault signal is the first level.

Finally, the invention provides detectors for detecting if a current fault exists in any one of at least the second and third phase loads of the first power source for generating a second and third phase load fault signal of a first level when a load fault exists in any one of at least the second and third phase loads of the first power supply and a second level when a load fault does not exist in any one of the second and third phase loads. The circuit for generating the first control signal is also responsive to the second and third phase load fault signal to generate the second level of the first control signal when the load fault signal is the first level.

The generator of the first control signal includes a D-type flip-flop, responsive to a source of a clock signal and a constant data of a high level, for outputting a high level and to a reset signal for producing an output of a low level in response to a high reset signal; and an AND gate having an input which is the output of the D-type flip-flop and an input which is an inversion of the second control signal. The clock signal source includes a power supply operation signal source producing a power supply operation signal having a high state when the first power source is operating; a pulse generator for producing pulses synchronized with the zero voltage crossing points of the first power source; and an AND gate having a pair of inputs and an output which is the first control signal, the first input being the power supply operation signal and the second input being the pulses synchronized with zero voltage crossing points.

Furthermore, in accordance with the invention, the first power source has a first phase in which current flow between the first power source and the electrical load is controlled by the first and second control signals and one or more additional phases providing current flow from the first power source to the electrical load; a detector for detecting when current flow between the first power source and the load is zero and producing a zero current pulse at each point when current flow is zero; a circuit, responsive to the operation of the one or more additional phases of the first power source, for generating one or more control signals for causing the disconnection of the first phase of the first power source from the electrical load; a gate, having a pair of inputs and an output, one of the inputs being the zero current pulses and another of the inputs being a logical function of the one or more control signals, the output of the gate having a first level upon the simultaneous occurrence of the zero current pulses and the logical function of the one or more control signals and a second level when the current pulses are not present; and, the circuit for generating the first control signal is also responsive to the output of the gate to generate the second level of the first control signal when the output of the gate is the first level. The gate may be an AND gate.

The one or more control signals may be comprised of any one or more of the following signals. An overcurrent signal having a second level when current in all of the at least second and third additional phases is below a predetermined magnitude and a first level when current in any one of the at least second and third phases is above the predetermined magnitude; a power level signal having a second level when at least $I_2^2 t$ and $I_3^2 t$, wherein $I_2$ is the current flow between a second phase and the electrical load, and $I_3$ is the current flow between a third phase and the electrical load and t is a predetermined time, is less than a predetermined magnitude and a first level when at least any one of the quantities $I_2^2 t$ and $I_3^2 t$ is greater than the predetermined magnitude; an instantaneous voltage trip signal having a second level when none of at least the second and third phases has a voltage greater than or less than a predetermined range of voltages and a first level when any one of at least the second and third phases has a voltage greater than or less than the predetermined range of voltages; and a RMS voltage trip signal having a second level when none of at least the second and third phases have an RMS voltage level exceeding a predetermined RMS level and a first level when any one of at least the second and third phases have an RMS voltage level exceeding the predetermined RMS level.

As used herein, a phase that is "tripped" is disconnected from the electrical load.

BRIEF DESCRIPTION OF DRAWINGS

FIG. 3 is a block diagram of a controller of a single phase of the multiple phase power supply of FIG. 1.

FIGS. 4A–B are an electrical schematic of the preferred form of master controller of FIGS. 1 and 2.

BEST MODE FOR CARRYING OUT THE INVENTION

Figure 1:
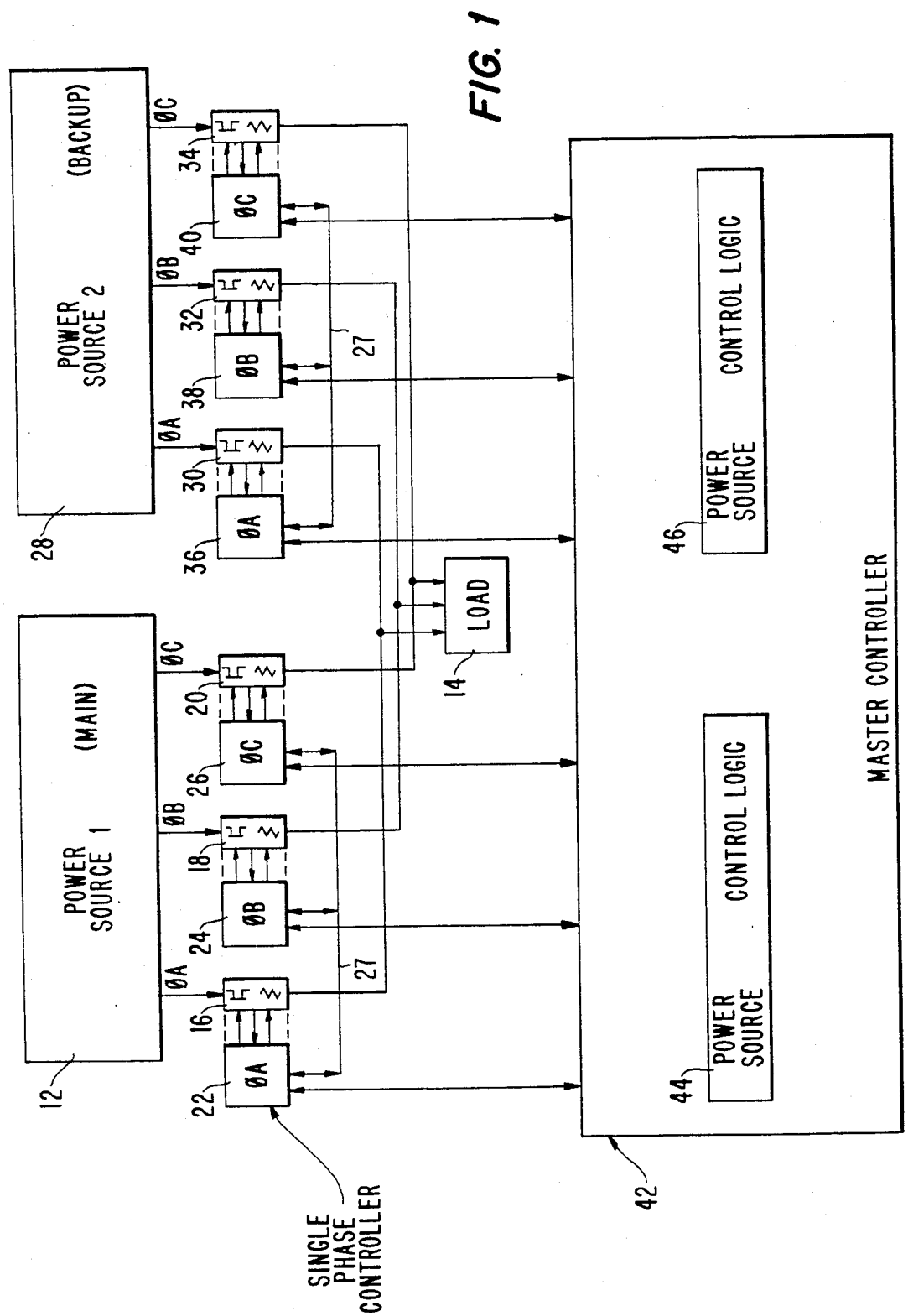
FIG. 1 is a block diagram of a multiple phase power supply system containing the present invention.

FIG. 1 illustrates a block diagram of a multiple phase power supply in accordance with the invention in which a first primary three phase power source 12 is connected to a three phase electrical load 14, which is a load requiring minimal interruption of power such as that which is found in airframes but is not limited thereto, and a backup power supply 28 is provided for connection to the load upon detection of a voltage fault. First, second and third switching circuits 16, 18 and 20 are respectively connected between phase A, B, and C outputs of the power source 12 and the corresponding phase loads (not illustrated) of the electrical load 14. Each of the switching circuits 16, 18 and 20 have a first conductivity permitting current to flow between the associated phase output of the power source 12 and the associated phase of the electrical load 14 and a second conductivity blocking current flow between the first power source and the electrical load. The conductivity of the first switching circuit 16 is controlled by a phase A controller 22. The conductivity of the second switching circuit 18 is controlled by a phase B controller 24. The conductivity of the third switching circuit 20 is controlled by a phase C controller 26. Each of the switching circuits 16, 18 and 20 are identical and each of the phase A, phase B and phase C controllers 22, 24 and 26 are identical. A preferred embodiment of a single phase controller and associated switch in accordance with the present invention is illustrated in FIG. 3 described below. A second backup power source 28, which is not normally connected to the load 14, has a construction identical to the first power source 12. The second power source 28 has switching circuits 30, 32 and 34 which are identical to the switching circuits 16, 18 and 20 of the first power supply 12 and phase controllers 36, 38 and 40 which are identical to the phase controllers 22, 24 and 26. For a first mode of operation of the power supply system the respective switching circuits 16, 18, and 20, and 30, 32 and 34 are connected with their associated phase A, B and C controllers 22, 24, and 26, and 36, 38 and 40 with the master controller 42. For the second mode of operation of the power supply system the respective phase controllers 22, 24 and 26, and 36, 38 and 40 are connected with line 27. In the first mode of operation of the power supply system, the line 27 is not present. Each of the phase controllers 22, 24, and 26 of the first power source 12 and 36, 38 and 40 of the second power source 28 generate a trip signal in response to a voltage fault condition in the associated phase. Master controller 42 is connected to each of the phase controllers 22, 24, 26, 36, 38 and 40 for controlling the operation of the switching circuits 16, 18, 20, 36, 38 and 40 in a timed sequence as described in U.S. patent application Ser. No. 07/137582, filed on even date herewith. The master controller 42 has a first power source control logic 44 for controlling the operation of the first power source 12 and a second power source control logic 46 for controlling the operation of the second power source 28.

In the first mode of operation, the master controller 42 is responsive to each of the phase controllers 22, 24 and 26 of the first power source 12 and to each of the phase controllers 36, 38 and 40 of the second power source 28. In the absence of a trip signal being generated by one or more of the phases A, B and C of the second power source 28 and in response to the generation of a trip signal by one or more of the phases A, B and C of the first power source 12, the master controller 42 causes each of the first power source phases which have generated the trip signal to be immediately disconnected by changing the conductivity of the switching circuits 16, 18 or 20 to the second conductivity and each of the first phases which have not generated a trip signal to be disconnected upon the detection of a zero current flow between each of the first power source phases and the electrical load by changing the conductivity of the switching circuits 16, 18 or 20 to the second conductivity and causes each of the second power source phases to be connected to the electrical load upon detection of a zero voltage in each of the second power source phases by changing the conductivity of the switching circuits 30, 32 and 34 to the first conductivity. In the first mode of operation, when a fault condition is present in one or more phases of the second power source 28, the master controller 42 disables the disconnection of the first power source 12 as described below with reference to FIG. 3 below.

In the second mode of operation of the power supply, the master controller 42 is responsive to each of the phase controllers 22, 24 and 26 of the first power source 12 and to all of the phase controllers 36, 38 and 40 of second power source 28. In the absence of a trip signal being generated by one or more of the phase controllers 36, 38 and 40 of the phases A, B and C of the second power source 28 and the generation of a trip signal by one or more of the phases of the first power source, the master controller 42 causes each of the first power source phases of the first power source to be disconnected immediately in response to the detection of the trip signal by changing the switching circuits 16, 18 and 20 to the second conductivity and causes each of the second power source phases to be connected to the electrical load upon detection of a zero voltage in each of the second power source phases by changing the switching circuits 30, 32 and 34 to the first conductivity. In the second mode of operation when a fault condition is present in one or more phases of the second power source 28, the master controller 42 disables the tripping of the first power source 12 as described below with reference to FIG. 3.

Figure 2:
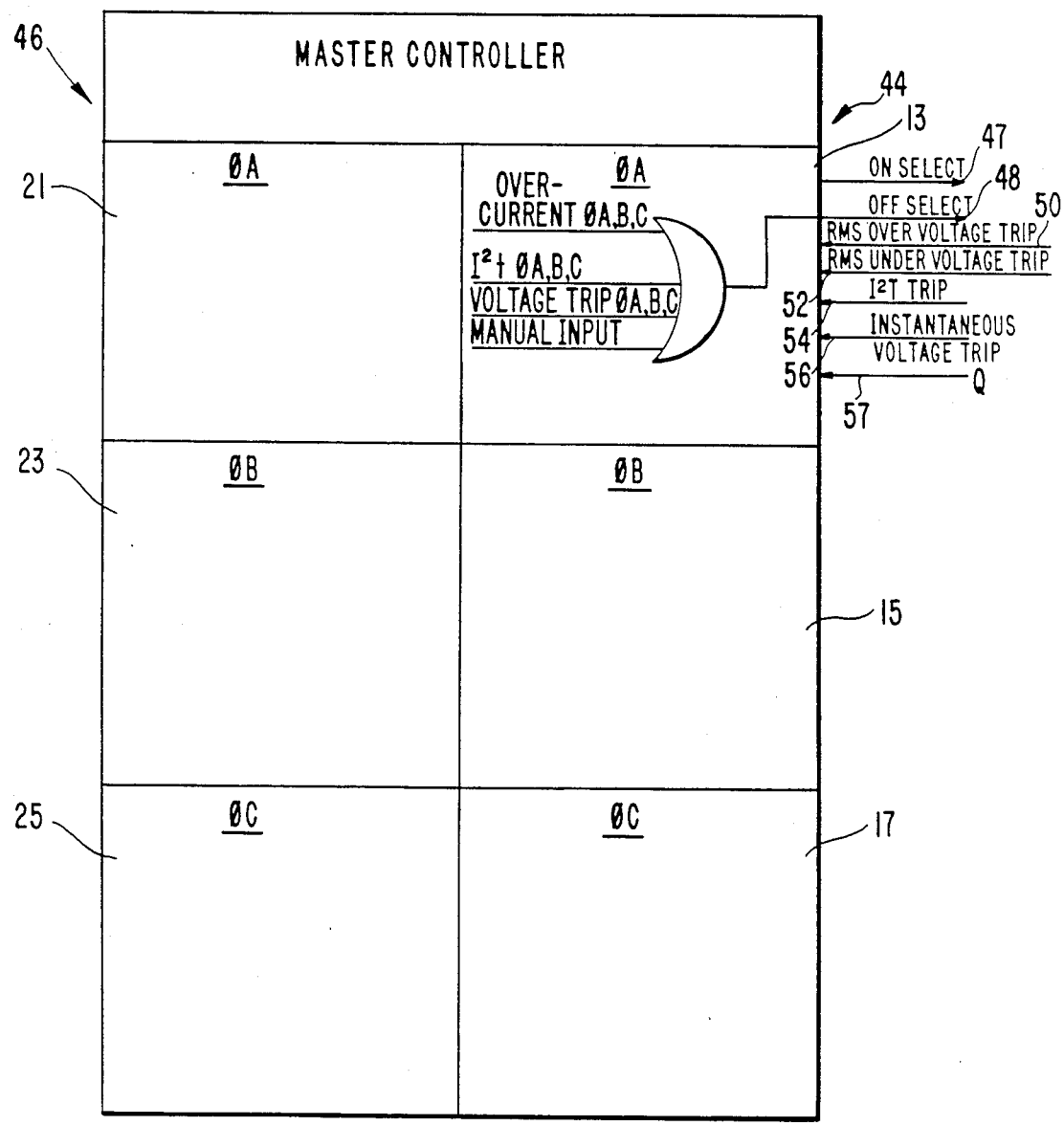
FIG. 2 is a block diagram of the master controller of FIG. 1.

FIG. 2 illustrates a more detailed block diagram of the master controller 42 of FIG. 1. The master controller 42 contains first, second and third master controller sections 13, 15 and 17 associated with the first power source 12 and first, second and third master controller sections 21, 23 and 25 associated with the second power source 28. Each of the master controller sections 13, 15, 17, 21, 23 and 25 are identical. The function of the master controller 42 is to control the operation of the first power source 12 and the second power source 28 such that under normal operation when no current or voltage fault conditions exist, phases A, B and C of the first power source are connected to phase A, B and C loads within the three phase load 14 of FIG. 1. When a current fault condition, indicative of a load fault, is detected in one or more of the phase A, B and C loads of the three phase load 14, the master controller 42 causes the automatic disconnection of the phases of the first power source 12 and does not activate the connection of the second power source 28. When a voltage fault condition is detected in one of the phases A, B and C of the first power source 12, the master controller 42 causes the controlled disconnection of the phases A, B and C from the phase A, B and C loads of the three phase load 14 and the controlled connection of phases A, B and C of the second power source 28 respectively to the phase A, B and C loads of the three phase load. For the first mode of operation, the phase of the first power source 12 in which the fault is detected is immediately disconnected and the remaining phases are disconnected synchronously with the detection of points in time of zero current flow between each phase and the electrical load 14 and, for the second mode of operation, all of the phases A, B and C of the first power source are disconnected immediately upon detection of a voltage fault in any one of the phases A, B and C of the first power source. For both modes of operation, the phases A, B and C of the second power source 28 are connected synchronously with the detection of points of zero voltage. Thus as illustrated in FIG. 1, during normal operation, switching circuits 16, 18 and 20, connected between the phases A, B and C and the corresponding phase loads A, B and C of the three phase load 14 are closed under the control of the master controller 42. When a voltage fault is detected, normally open switching circuits 30, 32 and 34 are closed and normally closed switching circuits 16, 18 and 20 are opened under the control of the master controller 42. Furthermore, when a current fault is detected, all of the switching circuits 16, 18, 20, 30, 32 and 34 ar opened under the control of the master controller 42.

Referring to FIG. 2, each of the master controller sections 13, 15 and 17 of the first power source 12 and the master controller sections 21, 23 and 25 of the second power source 28 have various inputs and outputs which couple the master controller 42 to individual phase controllers. In view of the fact that all of the input and output signals to each of the aforementioned master controller sections 13, 15, 17, 21, 23 and 25 are identical, only those input/output signals of master controller section 13 of the first power source 12 are discussed. However, it should be understood that each of the other master controller sections process these same signals. An ON SELECT signal 47 is produced which has a high level when the power supply is active. An OFF SELECT 48 signal is produced having a low level during normal operation of the power supply but a high level when any one of the following non-normal operating conditions is detected. The first condition is the detection of an overcurrent condition in at least the phases B or C of the first power source 12. The preferred form of detector for the overcurrent condition is described in U.S. patent application Ser. No. 07/137583, filed on even date herewith. The second condition is the detection of an $I^2t$ fault in at least the phases B and C of the first power source 12. The preferred form of the circuit for generating $I^2t$ trips is described in U.S. patent application Ser. No. 78,366, filed on July 27, 1987. The third condition is a voltage trip condition being detected in at least one of the phases B and C of the first power source 12. The first form of voltage trip condition produces a voltage trip signal indicating a voltage in the phases B or C greater than or less than a predetermined range of voltages. The preferred form of generator of the voltage trip signal is disclosed in U.S. patent application Ser. No. 07/137735, filed on even date herewith entitled. The second form of voltage trip condition produces an RMS voltage trip signal indicating a RMS voltage in the phases B or C greater than or less than a predetermined range of RMS voltage. The preferred form of RMS voltage trip detector is disclosed in FIG. 5. The fourth condition is a manual input from a switch provided on a control panel of the master controller 42 which is closable to cause shut down of each of the phases A, B and C of the first power source 12. An RMS over voltage trip 50 is produced by an under/over voltage detector 82 of FIG. 3 described below in detail with reference to FIG. 5. Similarly, an RMS under voltage trip 52 is produced by the under/over voltage detector 82 of FIG. 3 described below in detail with reference to FIG. 5. An $I^2t$ trip 54 is provided by an $I^2t$ detector 98 within the phase A controller described below with reference to FIG. 3 and preferably is produced by the $I^2t$ trip signal generator disclosed in U.S. patent application Ser. No. 78,366, filed on July 27, 1987. An instantaneous voltage trip 56 is provided by an instantaneous voltage detector 75 within the phase A controller 57 described below with reference to FIG. 3 and is preferably produced by the voltage fault detector disclosed in U.S. patent application Ser. No. 07/137725, filed on even date herewith. The overcurrent signal 57 is the "Q" output of the instantaneous overcurrent detector 68 described below with reference to FIG. 3 and is preferably produced by the instantaneous overcurrent detector disclosed in U.S. patent application Ser. No. 07/137583, filed on even date herewith.

FIG. 3 illustrates a detailed block diagram of the controller 22 for phase A of the first power source 12. It should be understood that all of the other phase controllers 24, 26, 36, 38 and 40 are of identical construction with identical inputs and outputs. For this reason these phase controllers will not be discussed in detail. A first switch 60 is between the first power source 12 and the phase A load 29 to control the conduction of current therebetween. Power supply unit 73 provides power to circuits. The first switch 60 is controlled by a first control signal having first and second levels which pass current to the load 29 when the first control signal is at the first level and which block current flow to the load when the first control signal is at the second level. A shunt circuit 62 is coupled in parallel with the first switch 60 to provide a shunt current path around the switch 60 when preliminary samples of the magnitude of the current indicate that a current fault may exist in the load 29. The shunt circuit 62 is comprised of a switch 64 and a current limiting impedance 66. The conductivity of the switch 64 is controlled by a second control signal having first and second levels produced by the instantaneous overcurrent detector 68. The second level of the second control signal causes the switch 64 to be open circuited when present sensing of the magnitude of current flow has not revealed samples exceeding a predetermined maximum and when a final determination of a load fault has been made. The second control signal has the first level after an initial determination of a current sample magnitude exceeding the maximum has been detected and during the making of a final determination of whether a non-transient current fault is present requiring disconnection of the power supply 12 from the load 29 as described below. The magnitude of the impedance 66 is chosen to prevent damage to phase A of the first power source 12 during determination of whether or not the overcurrent condition is of a transient nature not requiring disconnection of the power sources 12 and 28 from the electrical load 29 by taking a plurality of samples of current magnitude. In the preferred form of the invention, a predetermined count of samples, each exceeding the maximum rated current, must be accumulated in a counter, with samples below the maximum rated current decrementing the accumulated count of the counter before the second control signal Q changes from the first signal level to the second signal level indicating a current (load) fault. The second control signal is at the first level when the count of the counter is greater than zero and less than the predetermined count and is at the second level when the count of the counter is zero or the predetermined count. The preferred form of an instantaneous overcurrent detector 68 is disclosed in U.S. patent application Ser. No. 07/123573, filed on even date herewith.

The circuit for generating the first control signal is responsive to a plurality of power supply operating conditions as described below and to the second control signal. The first control signal has the first level in response to the Q output being high and the second control signal being the second (low) level. When the second control signal has the first (high) level, the first control signal is at the second level. The inverted output $\overline{Q}$ of the instantaneous overcurrent detector 68 is applied to AND gate 70 for the purpose of ensuring that under normal power supply operation, when the instantaneous current is not exceeding the maximum level and no voltage fault exists, the first switch 60 is conductive and the second switch 64 is non-conductive. With the output from the instantaneous overcurrent detector Q being normally low, the inverted output is normally high which causes the first control signal to assume the level of the Q output of D-type flip-flop 72. The D-type flip-flop 72 has a normally high level data input which is connected to power supply potential. The data level signal is outputted at Q when the clock input is high. A power supply unit 73 provides power from the first power source 12. A zero voltage crossing detector 74 produces an output train of pulses which are time coincident with the zero crossing points of phase A of the power source 12 for synchronizing when in time phase A is to be disconnected from the electrical load 29 in response to a voltage fault in one or more of the other phases. The ON SELECT signal 47 from the phase A portion of the master controller 42 is applied to AND gate 76 which enables the pulses outputted from the zero voltage crossing detector 74 to clock the flip-flop 72. Thus, under normal operation, the output Q of flip-flop 72 is high which enables AND gate 70 causing the first control signal to assume a first high signal level forcing switch 60 to be conductive.

Turning off of the switch 60 is controlled by the reset input of the flip-flop 72. Furthermore, when the reset input of the flip-flop 72 goes high, the phase A trip signal is generated which is inputted to the phase A master controller 42. The reset input of flip-flop 72 goes high when the output of OR gate 78 goes high. OR gate 78 is responsive to four different inputs in which any input high level causes the reset of the flip-flop 72 to go high driving the first control signal low turning off switch 60.

The first input 80 is from AND gate 79. AND gate 79 has a first input from the master controller 42 which is a second power source trip signal. The second power source trip signal is generated by the master controller 42 by ORing all of the trip signals 102 from the phases A, B and C of the second power source 81 and prevents the first power source 12 from being disconnected when a trip signal is generated on line 102 of one or more of the phases of the second power source 28. The second input from AND gate 79 is from OR gate 77. OR gate 77 has a first input from instantaneous voltage detector 75 which produces a high output signal when a voltage fault is detected in the associated phase. The instantaneous voltage detector 75 may be the voltage fault detector disclosed in U.S. application Ser. No. 07/123735, filed on even date herewith. The second input to the OR gate 77 is from the under/over voltage detector 82. The under/over voltage detector 82 compares the RMS value of the voltage from phase A with predetermined maximum and minimum RMS voltage limits. A block diagram of a suitable RMS under/over voltage detector 82 is discussed below with reference to FIG. 5.

The OFF SELECT signal 48 is gated by AND gate 86. The second input to the OR gate 78 is important in that it controls the time at which the switch 60 is open circuited with respect to phase A of the first power source 12 and causes switching to occur upon detection of zero current flow between phase A and the load 48. Switching of switch 60 at the zero current point reduces voltage surges consequent from inductive effects of turning off phase A of the first power source 12 and protects the switch against damage. A zero current crossing detector 88 monitors phase A of the first power source 12 to detect the points at which zero current occur. Zero current points may be detected by monitoring the voltage across resistor 90 and detecting the zero voltage points. The zero current crossing circuit 88 produces output pulses synchronized with the zero voltage points across resistor 90. The zero current crossing detector may be a comparator circuit such as that illustrated in FIG. 4 of U.S. patent application Ser. No. 07/137583, filed on even date herewith. The OFF SELECT signal 48 from the master controller 42 enables AND gate 86 to pass a high level pulse each time the zero current crossing detector 88 detects zero current flow.

The third input 92 to OR gate 78 is a signal derived from the phase trip signals from phases B and C of the first power source 12. The phase trip signals for phases B and C are produced by the OR gates 78 and of the phase controllers 24 and 26 of FIG. 1 and are outputted by lines 102. The phase trip signal from each of the phases B and C is applied to OR gate 94 to produce a high level output when either of the phases B and C has been tripped. It should be understood that a high level output from OR gate 78 generates the phase A trip signal 102.

Finally, the fourth input 96 to the OR gate 78 is applied from the $I^2t$ detector 96. The $I^2t$ detector 96 produces a high level output signal each time an $I^2t$ fault is detected. A preferred embodiment of the $I^2t$ detector is disclosed in U.S. patent application Ser. No. 78,366, filed on July 27, 1987.

A load voltage detector 100 produces an output signal having a high level each time the potential drops to zero at the load which is indicative of an open circuit malfunction of switch 60.

In FIG. 3 the connection of the outputs between the instantaneous overcurrent detector 68, instantaneous voltage detector 75, under/over voltage detector 82, and $I^2t$ detector 98 and the master controller 42 have been omitted for purposes of clarity. Furthermore, it should be understood that the master controller 42 is provided with a display of the status of each of the foregoing detectors 68, 75, 82 and 98 for each of the phase controllers 22, 24, 26, 36, 38 and 40.

FIG. 3 also illustrates in block diagram form a phase A controller 36 for the second power source 28 and its relationship with the load 29. It should be understood that the phase A controller 36 for the second power source 28 is identical to the phase A controller 22 for the voltage source 12 located to the left thereof in the figure. When there are no faults or trips, the phase A controller 22 for the first power source 12 controls the conductivity of switches 60 and 64 to permit current flow between the first power source 12 and the load 29. When a fault occurs in the first power source 12 without a fault being present in the second power source 28, the second power source is activated with the phase A controller 36 controlling the application of power to load 29.

FIGS. 4A-B illustrate an electrical schematic of a preferred embodiment of the master controller 42 of FIGS. 1 and 2. Conventional logic symbols are used to identify logic functions. Integrated circuits are identified by their conventional part number or designation. The inputs and outputs for only phase A of the first power source 12 have been shown in detail. It should be understood that the other inputs and outputs for phases B and C of the first power source 12 and phases A, B and C of the second power source 28 are identical and therefore are not illustrated.

Figure 5:
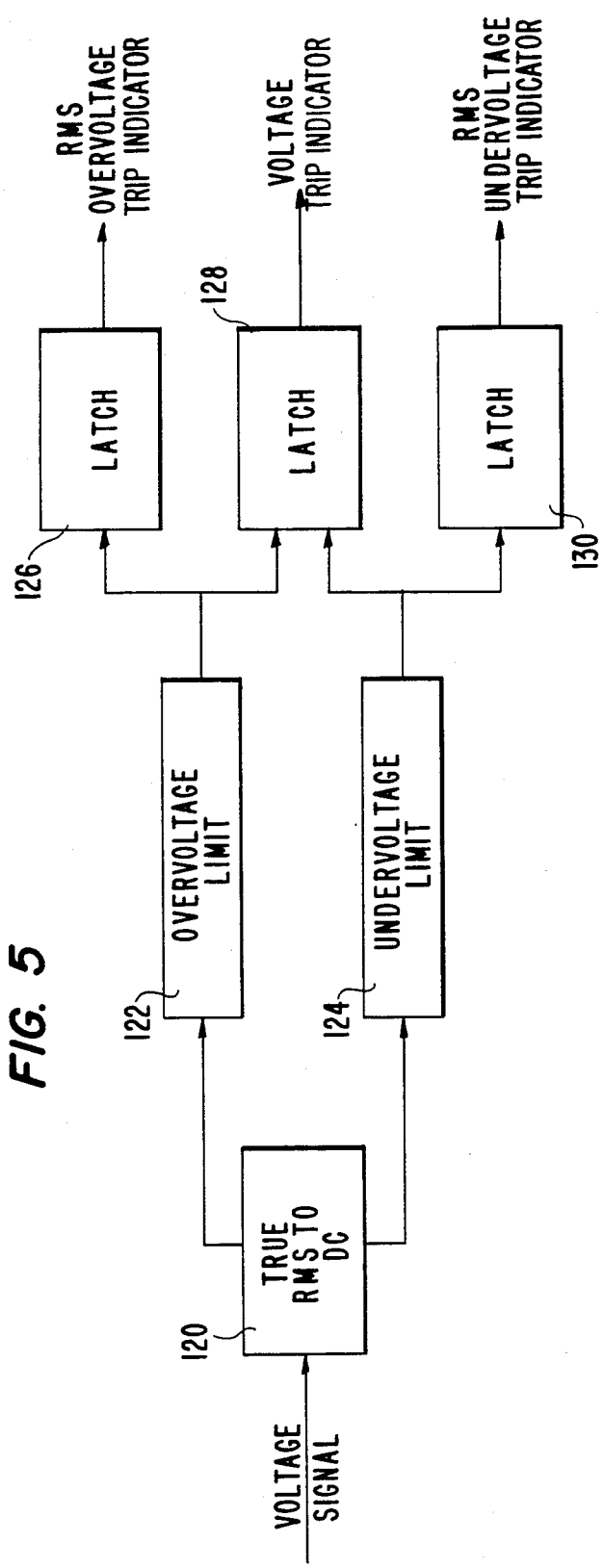
FIG. 5 is a block diagram of the RMS over/under voltage detector of FIG. 2.

FIG. 5 illustrates a block diagram of the RMS over-/under voltage detector 82 of FIG. 3. The input voltage from phase A of the first power source 12 is converted from a RMS value to DC by a RMS to DC converter 120 of known construction. The output signal from the RMS to DC converter 120 is compared by a first over voltage comparator 122 and a second under voltage comparator 124. The first over voltage comparator 122 outputs a high level signal when the input from the RMS to DC converter is above the predetermined limit of the comparator. The output of the voltage comparator 122 is latched in latch 126 to provide the RMS over voltage trip indicator which is inputted to the master controller sections 13, 15, 17, 21, 23 and 25 of the master controller 42 as discussed above with respect to FIG. 2. A high level output signal from the over voltage comparator 122 is also latched in latch 128 which produces the voltage trip indicator which is outputted by the under/over voltage detector 82. Similarly, the under voltage comparator 124 compares the output signal from the RMS to DC converter 120 to produce a high level output signal when the input voltage is greater in magnitude than the predetermined limit of the comparator. A high level output from the under voltage comparator 124 is latched by latch 130 to produce the RMS under voltage trip indicator which is inputted to the master controller sections 13, 15, 17, 21, 23 and 25 of the master controller 42 described above with reference to FIG. 2. In addition, a high level output signal from the under voltage comparator 124 is latched by latch 128 to produce the aforementioned voltage trip indicator outputted by the under/over voltage detector 82 of FIG. 3.

While the invention has been described in terms of its preferred embodiment, it should be understood that numerous modifications may be made thereto without departing from the spirit and scope of the invention as defined in the appended claims. It is intended that all such modifications fall within the scope of the claims.

We claim:

1. A current and voltage fault processing system for disconnecting an electrical load from a first power source upon the detection of a current fault in the load and disconnecting the first power source from the load and connecting a second power source to the load upon the detection of a voltage fault in the first power source comprising:
    (a) a first switching means disposed in series with the load and the first power source, conduction of the first switching means being controlled by a first control signal having first and second levels and passing current to the load when the first control signal is at the first level and blocking current flow when the first control signal is at the second level;
    (b) a shunt circuit, coupled in parallel with the first switching means, the shunt circuit containing a second switching means coupled to an impedance which limits the amount of current drawn by the load when the impedance is in series with the load, conduction of the second switching means being controlled by a second control signal having first and second levels and passing current to permit current flow through the impedance of the shunt circuit when the second control signal has the first level and blocking current flow when the second control signal has the second level;
    (c) means for generating the first control signal, responsive to a voltage level of the first power source, the means for generating the first control signal generating the first level of the first control signal in response to not detecting a voltage fault condition in the first power source and generating the second level of the first control signal in response to detecting a voltage fault condition in the first power source; and
    (d) means for generating the second control signal, responsive to a current level drawn from the first power source by the load, the means for generating the second control signal generating the first level of the second control signal in response to detection of a current flow between the first power source and the electrical load exceeding a maximum amount and generating the second level of the second control signal in response to detection of a current flow between the first power source and the electrical load not exceeding the maximum amount.

2. A system in accordance with claim 1 wherein:
    the means for generating the first control signal is also responsive to the second control signal for generating the second level of the first signal in response to the first level of the second control signal and for generating the first level of the first control signal in response to the second level of the second control signal and a voltage fault condition not being present.

3. A system in accordance with claim 2 further comprising:
    (a) means for detecting when the voltage from the first power source exceeds a predetermined maximum or minimum RMS voltage and generating a RMS level signal of a first level when the RMS voltage exceeds one of the predetermined maximum or minimum RMS voltages and a second level when the RMS voltage is less than both predetermined the maximum and minimum RMS voltages; and wherein;
    (b) the means for generating the first control signal is also responsive to the RMS level signal to generate the second level of the first control signal when the RMS level signal is the first level.

4. A system in accordance with claim 2 further comprising:
    (a) means for sensing current flow I between the first power source and the load and producing a power level signal having a first level when $I^2t$ exceeds a predetermined magnitude and a power level signal having a second level when $I^2t$ is less than a predetermined magnitude wherein t is a predetermined time; and wherein
    (b) the means for generating the first control signal is also responsive to the power level signal to generate the second level of the first control signal when the power level signal is the first level.

5. A system in accordance with claim 2 wherein:
    (a) the first power source has a first phase in which current flow between the first power source and the electrical load is controlled by the first and second control signals and one or more additional phases providing current flow between the first power source and the electrical load; and further comprising;
    (b) trip signal generation means for detecting if the one or more additional phases has been disconnected from the load in response to a fault condition in the one or more additional phases and for generating a one or more phase trip signal of a second level when the one or more additional phases have not been disconnected from the load and of the first level when any one of the one or more additional phases have been disconnected from the load; and
    (c) the means for generating the first control signal is also responsive to the one or more phase trip signal to generate the second level of the first control signal when the first phase trip signal is at the first level.

6. A system in accordance with claim 2 further comprising:
    (a) means for detecting when the voltage from the first power source exceeds a predetermined maximum or minimum RMS voltage and generating a RMS level signal of a first level when the voltage exceeds one of the predetermined maximum or minimum RMS voltages and a second level when the RMS voltage is less than both the predetermined maximum and minimum RMS voltages; and wherein;

(b) the means for generating the first control signal is also responsive to the RMS level signal to generate the second level of the first control signal when the RMS level signal is the first level; and further comprising (c) means for sensing current flow I between the first power source and the load and producing a power level signal having a first level when $I^2t$ exceeds a predetermined magnitude and a power level signal having a second level when $I^2t$ is less than a predetermined magnitude wherein t is a predetermined time; and wherein;

(d) the means for generating the first control signal is also responsive to the power level signal to generate the second level of the first control signal when the power level signal is the first level; and wherein;

(e) the first power source has a first phase in which current flow between the first power source and the electrical load is controlled by the first and second control signals and second and third phases provide current flow between the first power source and the electrical load;

(f) trip signal generation means for detecting if either the second or third phases has been disconnected from the load in response to a fault condition being detected in either the second or third phases from the load and for generating a second and third phase trip signal of a second level when the second and third phases have not been disconnected and a first level when either the second or third phases has been disconnected: and (g) the means for generating the first control signal is also responsive to the second and third phase trip signal to generate the second level of the first control signal when the first phase trip signal is at the first level.

7. A system in accordance with claim 5 further comprising:

(a) means for detecting when the voltage from the one or more additional phases of the first power source exceeds a predetermined minimum or maximum RMS voltage and for generating a one or more additional phase RMS level signal of a first level when the RMS voltage exceeds one of the predetermined maximum or minimum RMS voltages in the one or more additional phases and a second level when the voltage is less than both the predetermined maximum and minimum RMS voltages in the one or more additional phases; and wherein;

(b) the means for generating the first control signal is also responsive to the one or more additional phase RMS level signal from the one or more additional phases of the first power source to generate the second level of the first control signal when the one or more additional phase RMS level signal from the one or more additional phases of the first power source is the first level.

8. A system in accordance with claim 5 further comprising:

(a) means for sensing current flow $I_2$ between a second phase of the first power source and the electrical load and the current flow $I_3$ between a third phase of the first power source and the electrical load and for producing a second and third phase power level signal having a first level when at least either $I_2^2t$ or $I_3^2t$ exceeds a predetermined magnitude and a second level when at least both $I_3^2t$ and $I_3^2t$ is less than a predetermined magnitude wherein t is a predetermined time; and wherein;

(b) the means for generating the first control signal is also responsive to the second and third phase power level signal to generate the second level of the first control signal when the second and third phase power level signal is the first level.

9. A system in accordance with claim 5 further comprising:

(a) means for detecting when a voltage fault exists in any one of at least second and third phases of the first power source and generating a second and third phase voltage fault signal of a first level when a voltage fault exists in any one of at least the second and third phases of the first power source and a second level when a voltage fault does not exist in any one of second and third phases of the first power source; and wherein (b) the means for generating the first control signal is also responsive to the second and third phase voltage fault signal to generate the second level of the first control signal when the voltage fault signal is the first level.

10. A system in accordance with claim 5 further comprising:

(a) means for detecting when the voltage from second and third phases of the first power source exceeds a predetermined minimum or maximum RMS voltage and for generating a second and third phase RMS level signal of a first level when the RMS voltage from either the second or third phase exceeds one of the predetermined maximum or minimum RMS voltages and a second level when the RMS voltage in both the second and third phases is less than both the predetermined maximum and minimum voltages; and wherein (b) the means for generating the first control signal is also responsive to the second and third phase RMS level signal for generating the second level of the first control signal when the second and third phase RMS level signal is the first level; and further comprising (c) means for sensing current flow $I_2$ between the second phase of the first power source and the electrical load and the current flow $I_3$ between the third phase of the first power source and the electrical load and producing a second and third phase power level signal having a first level when either $I_2^2t$ or $I_3^2t$ exceeds a predetermined magnitude and a second level when both $I_2^2t$ and $I_3^2t$ is less than a predetermined magnitude wherein t is a predetermined time; and wherein (d) the means for generating the first control signal is also responsive to the second and third phase power level signal to generate the second level of the first control signal when the second and third phase power level signal is the first level; and further comprising (e) means for detecting when a voltage fault exists in either the second or third phases of the first power source and generating a second and third phase voltage fault signal of a first level when a voltage fault exists in any one of the second and third phases of the first power source and a second level when a voltage fault does not exist in any one of the second and third phases of the first power source; and wherein (f) the means for generating the first control signal is also responsive to the second and third phase voltage fault signal to generate the second level of the first control signal when the voltage fault signal is the first level.

11. A system in accordance with claim 2 wherein the means for generating the first control signal comprises:
(a) a D-type flip-flop, responsive to a source of a clock signal, for clocking a constant data input of a high level and to a reset signal for producing an output signal of a high level in response to a clock signal and a low level in response to a reset pulse; and
(b) an AND gate having an input which is the output of the D-type flip-flop and an input which is an inversion of the second control signal and an output which is the first control signal.

12. A system in accordance with claim 11 wherein the clock signal source comprises:
(a) a power supply operation signal source producing a power supply operation signal having a high state when the first power source is operating;
(b) means for producing pulses synchronized with zero voltage crossing points of the first power source; and
(c) an AND gate having a pair of inputs, the first input being the power supply operation signal and the second input being the pulses synchronized with zero voltage crossing points, the output of the AND gate being the clock signal.

13. A system in accordance with claim 1 further comprising:
(a) the first power source has a first phase in which current flow between the first power source and the electrical load is controlled by the first and second control signals and one or more additional phases providing current flow between the first power source and the electrical load;
(b) means for detecting when current flow between the first power source and the load is zero and providing a zero current pulse at each point where current flow is zero;
(c) means, responsive to the operation of the one or more additional phases of the first power source, for generating one or more control signals for causing the disconnection of the first phase of the first power source from the electrical load when a fault occurs pertaining to the operation of the one or more additional phases;
(d) gating means, having a pair of inputs and an output, one of the inputs being the zero current pulses and another of the inputs being a logical function of the one or more control signals, the output having a first level upon the simultaneous occurrence of the zero current pulses and the logical function of the one or more control signals and a second level when the current pulses are not present; and
(e) the means for generating the first control signal is also responsive to the output of the gating means to generate the second level of the first control signal when the output of the gating means is the first level.

14. A system in accordance with claim 13 wherein the gating means is a AND gate.

15. A system in accordance with claim 13 wherein the one or more control signals comprise:
an overcurrent signal having a second level when current in all of the at least the one or more phases is below a predetermined magnitude and a first level when current in any one of the one or more phases is above the predetermined magnitude.

16. A system in accordance with claim 13 wherein the one or more control signals comprise:
a power level signal having a second level when at least $I_2^2 t$, and $I_3^2 t$, wherein $I_2$ is the current flow between a second phase and the electrical load, $I_3$ is the current flow between a third phase and the electrical load and t is a predetermined time, is less than a predetermined magnitude and a first level when any one of the quantities $I_2^2 t$ and $I_3^2 t$ is greater than the predetermined magnitude.

17. A system in accordance with claim 13 wherein the one or more control signals comprise:
a voltage trip signal having a second level when none of the second and third phases has been disconnected from the load and a first level when any one of the second and third phases has been disconnected from the load.

18. A system in accordance with claim 17 wherein:
(a) the first level of the voltage trip signal is generated in response to a RMS voltage level of at least either the second or third power phases exceeding a predetermined level; and
(b) at least the second and third phases each have a RMS voltage level detector for detecting when the RMS voltage exceeds the predetermined level.

19. A system in accordance with claim 17 wherein:
(a) the first level of the voltage trip signal is generated in response to a voltage level of either the second or third phases exceeding a predetermined level; and
(b) the second and third phases each have a voltage level detector for detecting when the voltage exceeds the predetermined level.

20. A system in accordance with claim 2 further comprising:
(a) the first power source has a first phase in which current flow between the first power source and the electrical load is controlled by the first and second control signals and one or more additional phases providing current flow from the first power source to the electrical load;
(b) means for detecting when current flow between the first power source and the load is zero and providing a zero current signal at each point where current flow is zero;
(c) means, responsive to the operation of the one or more additional phases of the first power source, for generating one or more control signals for causing the disconnection of the first phase of the first power source from the electrical load when a fault occurs, pertaining to the operation of the one or more additional phases;
(d) gating means, having a pair of inputs and an output, one of the inputs being the zero current pulses and another of the inputs being a logical function of the one or more control signals, the output having a first level upon the simultaneous occurrence of the zero current pulses and the logical function of the one or more control signals and a second level when the current pulses are not present; and (e) the means for generating the first control signal is also responsive to the output of the gating means to generate the second level of the first control signal when the output of the gating means is the first level.

21. A system in accordance with claim 20 wherein the gating means is an AND gate.

22. A system in accordance with claim 20 wherein the one or more control signals comprise:
an overcurrent signal having a second level when current in all of at least a second and a third phase is below a predetermined magnitude and a first level when current in any one of the at least the second and third phase is above the predetermined magnitude.

23. A system in accordance with claim 20 wherein the one or more control signals comprise:
a power level signal having a second level when at least $I_2^2 t$, and $I_3^2 t$, wherein $I_2$ is the current flow between a second phase and the electrical load, $I_3$ is the current flow between a third phase and the electrical load and t is a predetermined time, is less than a predetermined magnitude and a first level when any one of the quantities $I_2^2 t$ and $I_3^2 t$ is greater than the predetermined magnitude.

24. A system in accordance with claim 20 wherein the one or more control signals comprise:
a voltage trip signal having a second level when none of at least the second and third phases has been disconnected from the load and a first level when any one of the at least second and third phases has been disconnected from the load.

25. A system in accordance with claim 24 wherein:
(a) the first level of the voltage trip signal is generated in response to a RMS voltage level of at least either the second or third power phases exceeding a predetermined level; and
(b) the second and third phases each have an RMS voltage level detector for detecting when the RMS voltage exceeds the predetermined level.

26. A system in accordance with claim 24 wherein:
(a) the first level of the voltage trip signal is generated in response to a voltage level of at least either the second or third phases exceeding a predetermined level; and
(b) at least the second and third phases each have a voltage level detector for detecting when the voltage exceeds the predetermined level.

27. A system in accordance with claim 2 wherein:
the means for generating the second control signal further generates the second level in response to detection of a load fault.

28. A system in accordance with claim 27 wherein the means for generating the second control signal comprises:
means for detecting if a load fault exists.

29. A system in accordance with claim 28 wherein the means for detecting if a current fault exists comprises:
means for detecting if current flow between the electrical load and the power supply exceeds a maximum.

30. A system in accordance with claim 29 wherein the means for detecting if current flow between the load and the power supply exceeds a maximum generates the second level of the control signal prior to detecting any current flow exceeding the maximum and when a predetermined count of samples exceeding the maximum has been counted.

31. A system in accordance with claim 30 wherein the means for detecting if current flow exceeds the maximum further decrements the count when a sample less than the maximum is detected.

32. A system in accordance with claim 1 further comprising:
(a) means for detecting when the voltage from the first power source exceeds a predetermined maximum or minimum RMS voltage and generating a RMS level signal of a first level when the RMS voltage exceeds one of the predetermined maximum or minimum RMS voltages and a second level when the RMS voltage is less than both predetermined the maximum and minimum RMS voltages; and wherein;
(b) the means for generating the first control signal is also responsive to the RMS level signal to generate the second level of the first control signal when the RMS level signal is the first level.

33. A system in accordance with claim 1 further comprising:
(a) means for sensing current flow I between the first power source and the load and producing a power level signal having a first level when $I^2 t$ exceeds a predetermined magnitude and a power level signal having a second level when $I^2 t$ is less than a predetermined magnitude wherein t is a predetermined time; and wherein
(b) the means for generating the first control signal is also responsive to the power level signal to generate the second level of the first control signal when the power level signal is the first level.

34. A system in accordance with claim 1 wherein:
(a) the first power source has a first phase in which current flow between the first power source and the electrical load is controlled by the first and second control signals and one or more additional phases providing current flow between the first power source and the electrical load; and further comprising;
(b) trip signal generation means for detecting if the one or more additional phases has been disconnected from the load in response to a fault condition in the one or more additional phases and for generating a one or more phase trip signal of a second level when the one or more additional phases have not been disconnected from the load and of the first level when any one of the one or more additional phases have been disconnected from the load; and
(c) the means for generating the first control signal is also responsive to the one or more phase trip signal to generate the second level of the first control signal when the first phase trip signal is at the first level.

35. A system in accordance with claim 1 further comprising:
(a) means for detecting when the voltage from the first power source exceeds a predetermined maximum or minimum RMS voltage and generating a RMS level signal of a first level when the voltage exceeds one of the predetermined maximum or minimum RMS voltages and a second level when the RMS voltage is less than both the predetermined maximum and minimum RMS voltages; and wherein;
(b) the means for generating the first control signal is also responsive to the RMS level signal to generate the second level of the first control signal when the RMS level signal is the first level; and further comprising (c) means for sensing current flow I between the first power source and the load and producing a power level signal having a first level when $I^2t$ exceeds a predetermined magnitude and a power level signal having a second level when $I^2t$ is less than a predetermined magnitude wherein t is a predetermined time; and wherein;

(d) the means for generating the first control signal is also responsive to the power level signal to generate the second level of the first control signal when the power level signal is the first level; and wherein;

(e) the first power source has a first phase in which current flow between the first power source and the electrical load is controlled by the first and second control signals and second and third phases provide current flow between the first power source and the electrical load;

(f) trip signal generation means for detecting if either the second or third phases has been disconnected from the load in response to a fault condition being detected in either the second or third phases from the load and for generating a second and third phase trip signal of a second level when the second and third phases have not been disconnected and a first level when either the second or third phases has been disconnected: and (g) the means for generating the first control signal is also responsive to the second and third phase trip signal to generate the second level of the first control signal when the first phase trip signal is at the first level.

36. A system in accordance with claim 34 further comprising:
(a) means for detecting when the voltage from the one or more additional phases of the first power source exceeds a predetermined minimum or maximum RMS voltage and for generating a one or more additional phase RMS level signal of a first level when the RMS voltage exceeds one of the predetermined maximum or minimum RMS voltages in the one or more additional phases and a second level when the voltage is less than both the predetermined maximum and minimum RMS voltages in the one or more additional phases; and wherein;
(b) the means for generating the first control signal is also responsive to the one or more additional phase RMS level signal from the one or more additional phases of the first power source to generate the second level of the first control signal when the one or more additional phase RMS level signal from the one or more additional phases of the first power source is the first level.

37. A system in accordance with claim 34 further comprising:
(a) means for sensing current flow $I_2$ between a second phase of the first power source and the electrical load and the current flow $I_3$ between a third phase of the first power source and the electrical load and for producing a second and third phase power level signal having a first level when at least either $I_2^2t$ or $I_3^2t$ exceeds a predetermined magnitude and a second level when at least both $I_3^2t$ and $I_3^2t$ is less than a predetermined magnitude wherein t is a predetermined time; and wherein;

(b) the means for generating the first control signal is also responsive to the second and third phase power level signal to generate the second level of the first control signal when the second and third phase power level signal is the first level.

38. A system in accordance with claim 34 further comprising:
(a) means for detecting when a voltage fault exists in any one of at least second and third phases of the first power source and generating a second and third phase voltage fault signal of a first level when a voltage fault exists in any one of at least the second and third phases of the first power source and a second level when a voltage fault does not exist in any one of second and third phases of the first power source; and wherein
(b) the means for generating the first control signal is also responsive to the second and third phase voltage fault signal to generate the second level of the first control signal when the voltage fault signal is the first level.

39. A system in accordance with claim 34 further comprising:
(a) means for detecting when the voltage from second and third phases of the first power source exceeds a predetermined minimum or maximum RMS voltage and for generating a second and third phase RMS level signal of a first level when the RMS voltage from either the second or third phase exceeds one of the predetermined maximum or minimum RMS voltages and a second level when the RMS voltage in both the second and third phases is less than both the predetermined maximum and minimum voltages; and wherein
(b) the means for generating the first control signal is also responsive to the second and third phase RMS level signal for generating the second level of the first control signal when the second and third phase RMS level signal is the first level; and further comprising
(c) means for sensing current flow $I_2$ between the second phase of the first power source and the electrical load and the current flow $I_3$ between the third phase of the first power source and the electrical load and producing a second and third phase power level signal having a first level when either $I_2^2t$ or $I_3^2t$ exceeds a predetermined magnitude and a second level when both $I_2^2t$ and $I_3^2t$ is less than a predetermined magnitude wherein t is a predetermined time; and wherein
(d) the means for generating the first control signal is also responsive to the second and third phase power level signal to generate the second level of the first control signal when the second and third phase power level signal is the first level; and further comprising
(e) means for detecting when a voltage fault exists in either the second or third phases of the first power source and generating a second and third phase voltage fault signal of a first level when a voltage fault exists in any one of the second and third phases of the first power source and a second level when a voltage fault does not exist in any one of the second and third phases of the first power source; and wherein
(f) the means for generating the first control signal is also responsive to the second and third phase voltage fault signal to generate the second level of the first control signal when the voltage fault signal is the first level.

* * * * *